Aug. 6, 1940.  C. C. BALDWIN  2,210,195
PACKAGE FOR MERCHANDISING CHEWING GUM
Filed Nov. 28, 1938  2 Sheets-Sheet 2
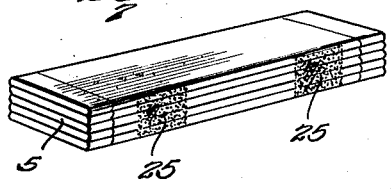
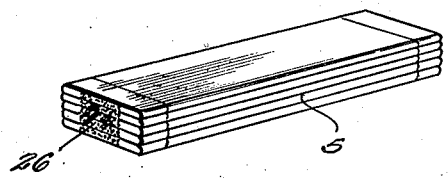
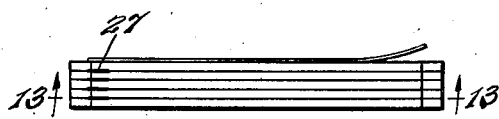
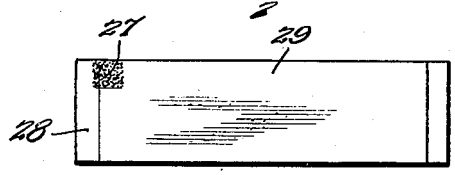
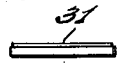
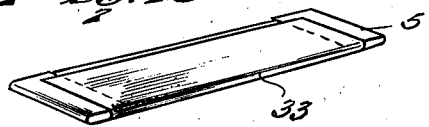
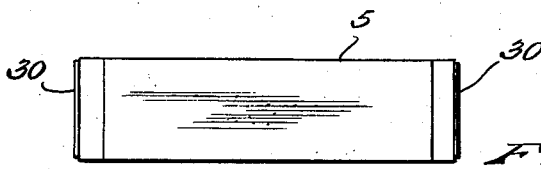
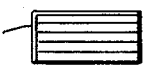
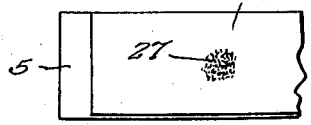
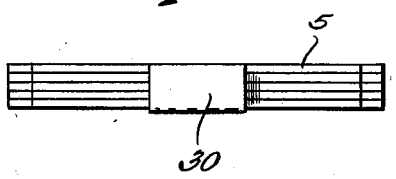
Inventor
Charles C. Baldwin.
By Lacey & Lacey
Attorneys Patented Aug. 6, 1940

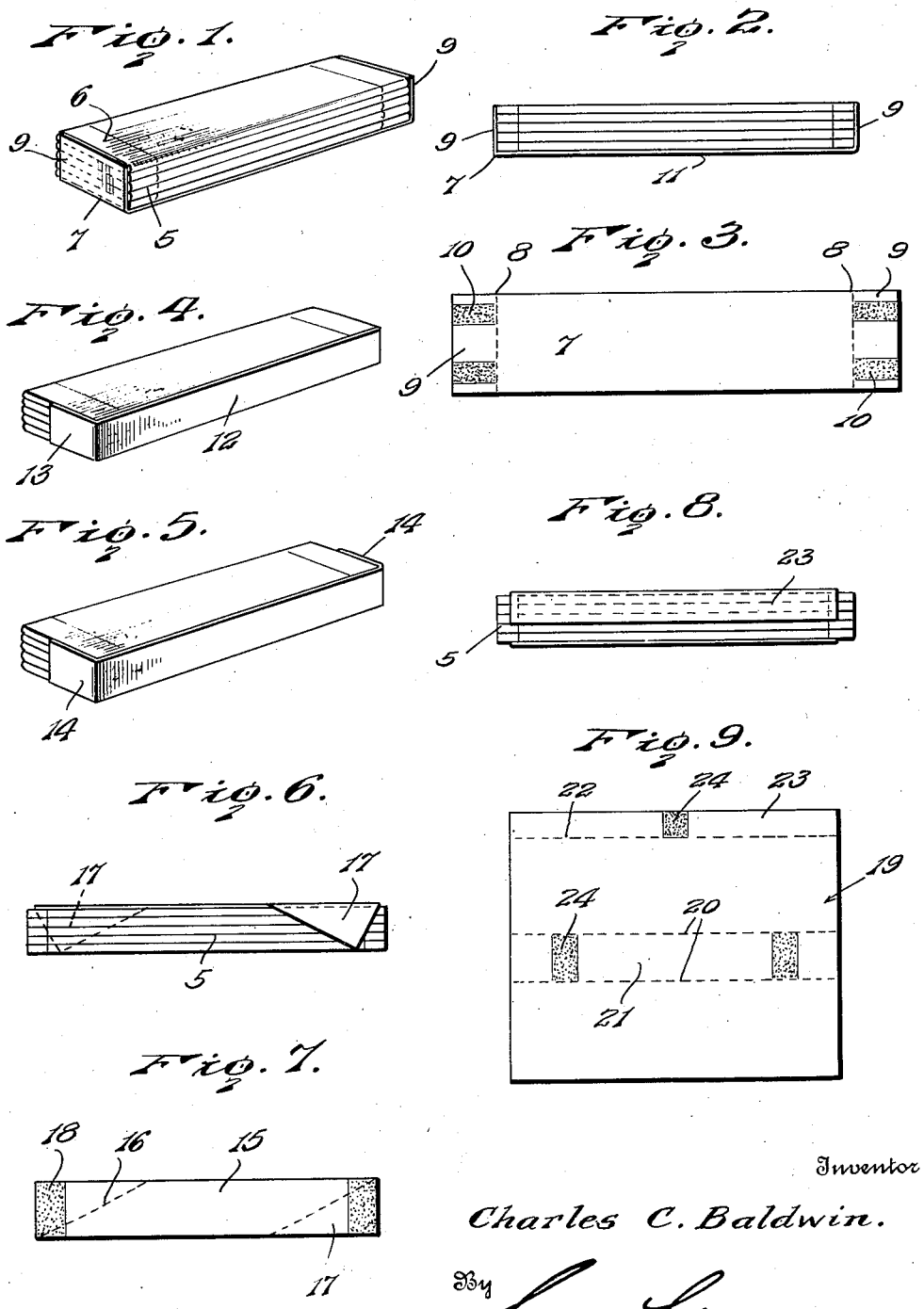

2,210,195

UNITED STATES PATENT OFFICE 2,210,195

PACKAGE FOR MERCHANDISING CHEWING GUM

Charles C. Baldwin, St. Louis, Mo.

Application November 28, 1938, Serial No. 242,831

5 Claims. (Cl. 99—180)

This invention relates to packages for merchandising various kinds of commodities and more particularly to a package for vending chewing gum in stick form.

The object of the invention is to provide a package comprising a plurality of individually wrapped sticks of gum arranged in superposed order and bound together or otherwise detachably united to form a stack, the individual sticks of which may be successively detached when desired without disturbing the intimate continuity or union of the remaining sticks in the stack, thereby to prevent the unused sticks of gum from becoming separated, dislodged or lost in the process of handling or carrying the package.

A further object of the invention is to provide a package of gum, the individual sticks of which are detachably united by adhesive material which may be applied either directly to the edges or confronting faces of the sticks of gum constituting the pack or to a binding element applied to the exterior of the sticks of gum after they have been arranged in stacked formation to prevent accidental separation of said sticks.

A further object is to position the adhesive material on the wrappers of the individual sticks of gum in such a manner that said adhesive material will bridge and seal the inner and outer wrappers of the individual sticks of gum and prevent displacement thereof until the seal is manually broken.

A still further object of the invention is generally to improve this class of devices so as to increase their utility, durability and efficiency as well as effect economies in production.

In the accompanying drawings forming a part of this specification and in which similar numerals of reference indicate corresponding parts in all the figures of the drawings:

Figure 1 is a perspective view of a package of chewing gum embodying the present invention, Figure 2 is a side elevation, Figure 3 is a plan view of the binder or wrapper for holding the sticks of gum in stacked formation, Figure 4 is a perspective view illustrating a modified form of the invention, Figure 5 is a similar view showing another modification, Figure 6 is a side elevation showing a different manner of holding the sticks of gum in stacked formation, Figure 7 is a plan view of the binder or wrapper of Figure 6 detached, Figure 8 is a side elevation illustrating a further modification, Figure 9 is a plan view of the binder or wrapper employed in connection with the stack shown in Figure 8, Figure 10 is a perspective view of a stack of gum showing adhesive material applied directly to the outer side edges of the sticks of gum, Figure 11 is a perspective view showing the adhesive material applied directly to the ends of the sticks of gum, Figure 12 is a side elevation illustrating another form of the device in which the adhesive material is interposed between adjacent sticks of gum, Figure 13 is a horizontal sectional view taken on the line 13—13 of Figure 12, Figure 14 is a top plan view showing a simplified construction of binding elements for the sticks of gum constituting the pack, Figure 15 is a side elevation of another modification showing the binding element attached to the side edges of the adjacent sticks of gum, Figure 16 is a perspective view of a single stick of gum in which the outer wrapper or enclosing jacket of the gum is dispensed with and a single sheet of paper or other material substituted in lieu thereof, Figure 17 is an end view of Figure 16, Figure 18 is a perspective view of a stick of gum showing the covering strip folded over one longitudinal edge of the inner wrapper, Figure 19 is an end view thereof, Figure 20 is a side elevation showing one method of securing the stick of gum illustrated in Figure 18 in stacked formation, and Figure 21 is a top plan view showing another method of securing the sticks together in stacked formation.

The improved device forming the subject-matter of the present invention may be used for housing and merchandising any kind of commodity in package form, and in Figure 1 is shown applied to a package of chewing gum, the sticks 5 of which are individually wrapped, as indicated at 6, and disposed one upon the other in superposed relation to form a block or stack.

The sticks of gum constituting the stack may be detachably secured together in various ways to permit successive removal of the sticks from the stack when desired. In Figure 1 of the drawings, I have shown a binding element 7 of the construction shown in Figure 3, said binding element comprising an elongated strip of paper or other suitable material having transverse fold lines 8 at the opposite ends thereof and defining securing tabs 9, portions of the inner faces of which are coated with suitable adhesive material 10 for engagement with the adjacent ends of the sticks of gum thereby to hold said sticks in stacked formation and against accidental separation while at the same time permitting the individual sticks of gum to be detached from the stack when desired. It will be noted that the intermediate portion 11 of the binder 7 covers one face of the stack and the entire exterior of said binder may be used for the display of suitable advertising matter.

If desired, however, instead of extending the binder 7 over one face of the stack or package, said binder may extend along one longitudinal edge thereof, as indicated at 12 in Figure 4 of the drawings, and the ends of said binding element may be glued or otherwise secured to the sticks of gum at one end of the pack, as indicated at 13, or to both ends of the pack, as indicated at 14 in Figure 5 of the drawings.

In Figures 6 and 7 of the drawings, I have shown a further modification of the invention in which the binding element 15 is formed of a single strip of material having diagonal fold lines 16 at the opposite ends thereof and defining substantially triangular securing tabs or flaps 17 adapted to be bent downwardly over and in contact with the several sticks of gum at the opposite side edges of the pack and secured to said sticks by suitable adhesive material, indicated at 18. In some cases, the binding element may entirely surround the major portion of the stack or package, and when this form of the device is used, I construct the binder 19 from a blank of paper or other material of the construction shown in Figure 9 of the drawings, said blank being substantially rectangular in shape and provided with spaced intermediate fold lines 20 defining a side wall 21 and a single fold line 22 near one end of the blank and defining a securing flap 23. The surface of the blank at the side wall 21 and flap 23 is coated at suitable intervals with adhesive material 24, the adhesive material 24 on the side wall 21 serving to hold the sticks of gum at one longitudinal edge of the pack in intimate contact with each other and the adhesive material 24 on the flap 23 serving to hold the edges of the adjacent sticks of gum at the other side of the package against accidental separation. In this form of the device both the top and bottom of the binder as well as one or both sides thereof may be used for advertising purposes.

In some instances, it may be found desirable to dispense with a separate binding element, and when said binding element is omitted, the sticks of gum comprising the package are held together by applying adhesive material 25 at one or more intervals directly to the sticks of gum at one or both sides of the package, as best shown in Figure 10 of the drawings. If desired, however, the adhesive material instead of being applied to the sides of the package may be applied to one or both ends of the package, as indicated at 26 in Figure 11 of the drawings.

It will thus be seen that in all of the forms of the device just described the individual sticks of gum are detachably secured together in stacked formation and normally held from accidental separation by the binding element or adhesive material previously referred to and that said sticks of gum may be successively detached from the stack or package when desired by exerting a slight tearing action thereon, leaving the remaining sticks of gum bound together in compact form so as to prevent accidental separation and loss of the unused sticks of gum.

In Figures 12 and 13 of the drawings, there is illustrated another form of the device in which the individual sticks of gum are held in stacked formation by adhesive material 27 secured to the upper and lower faces of the individual wrappers at either one or both sides or at one or both ends of the sticks so that, when the sticks of gum are arranged in stacked form and pressed together, the adhesive material will unite contiguous faces of the wrappers and hold all of said sticks in assembled position. By reference to Figure 13 of the drawings, it will be noted that the adhesive material 27 in this instance overlaps the edge of the outer wrapper or jacket 29 in contacting both the said outer wrapper and the inner wrapper 28 so as to form a seal and prevent accidental movement or separation of said wrappers while at the same time holding the individual wrappers of one stick in close intimate contact with the wrapper of an adjacent stick, or if preferred, the adhesive material 27 may be positioned so as to contact only the outer wrappers of the sticks of gum in the formation of the package, or as shown in Figure 21 of the drawings, illustrating another modification having the adhesive material 27 positioned near the center of the wrapped sticks of gum.

If desired, the individual sticks of gum comprising a stack or package may be held together by a relatively small binder 30 which is positioned at one or opposite sides or at one or opposite ends of the package and is secured to the edges of the adjacent sticks of gum by suitable adhesive material, as best shown in Figures 14 and 15 of the drawings.

Under the present method of dispensing stick chewing gum in package form, the individual sticks of gum are generally provided with an inner wrapper of moisture-proof material and an outer wrapper or jacket for the display of advertising matter, as previously stated, and in order to economize in the material of which the outer wrapper is made. I propose to substitute for said outer wrapper a single strip of paper or other material, as indicated at 31 in Figures 16 and 17 of the drawings. This covering strip 31 which takes the place of the conventional outer wrapper is preferably secured to the inner wrapper by adhesive material 32 positioned near the end and on the inner side of said covering strip so as to contact with the folded back end portions as well as portions of the main body of the inner wrapper or assembly, as best shown in Figure 16 of the drawings. If desired, the covering strip 31 may have one longitudinal edge thereof folded over the adjacent edge of the stick of gum, as indicated at 33 in Figure 18 of the drawings, which when used in connection with a wrapper or binder 34, as indicated in Figure 20 of the drawings, permits of greater flexibility in bringing the package to open position, as will be readily understood, since, in this instance, the binder or wrapper is attached to the strip 31 at its overlapping free edge when attached to the stick of gum, the function of the strip 31 in both cases being dual in character. That is to say, to provide a suitable advertising surface for each stick of gum and at the same time reduce the cost of the outer wrapper. The sticks of gum shown in Figures 16 to 19 inclusive may be used in connection with the formation of any of the various types of packages.

It will be noted that in all forms of the device herein shown and described there is provided a package consisting of a plurality of individually wrapped sticks of gum disposed in stacked formation and normally held against accidental displacement by suitable adhesive material applied either directly to the sticks or to a binder attached to the sticks of the package, the construction of each form of the device being such as to permit successive detachment of the individual sticks of gum without disturbing the remaining sticks of the pack so as to prevent their separation or loss in the process of handling or carrying the package. This I consider the salient feature of my invention, and it is the purpose of this application to cover any construction of package capable of functioning in the aforesaid manner.

While the package is principally designed for merchandising or vending sticks of chewing gum, it will, of course, be understood that said package may be used with equally good results for housing and dispensing sticks of chocolate or any kind of confection or other commodity without departing from the spirit of the invention.

Having thus described the invention, what is claimed as new is:

1. A merchandising package comprising a plurality of individually wrapped sticks of gum disposed one above the other in superposed order to form a unitary stack, and a separate binding strip having adhesive engagement with at least two walls of the stack for detachably holding said sticks of gum in stacked formation, the outer edges of the wrapped sticks at the other walls of the stack being free and exposed to permit successive detachment of said sticks of gum.

2. A merchandising package comprising a plurality of sticks of gum disposed in superposed order to form a vertical stack, inner and outer wrappers for said sticks, and adhesive material on the outer surface of each outer wrapper at one end thereof and overlapping and contacting the adjacent inner wrapper to prevent accidental longitudinal separation thereof, the adhesive material on the wrapper of one stick of gum adhering to the wrappers of the adjacent sticks of gum to detachably hold all of said sticks in stacked formation, the outer edges of the wrapped sticks of gum being free and exposed to permit successive detachment thereof.

3. A merchandising package comprising a plurality of individually wrapped sticks of gum disposed one above the other in superposed order to form a stack, and a separate binding strip fitting over and frictionally engaging one side of the stack and provided with oppositely disposed securing tabs folded over the edges of the adjacent sticks of gum and adhesively secured thereto, the outer edges of the wrapped sticks of gum between said securing tabs being free and exposed to permit successive detachment of said sticks of gum.

4. A merchandising package comprising a plurality of detachably united superposed sticks of gum each provided with an inner and outer wrapper, and a coating of adhesive material on the outer surface of each outer wrapper of less width than the outer wrapper and overlapping and adhesively engaging the adjacent inner wrapper and the outer wrappers of adjacent sticks of gum for holding said sticks of gum detachably united in stacked formation and preventing sliding separation of the inner and outer wrappers of each stick.

5. A merchandising package comprising a plurality of sticks of gum arranged in superposed order to form a stack, an inner wrapper for each stick of gum provided with inwardly folded end portions covering strips for the inner wrappers, adhesive material on the inner surface of the covering strips and engaging said folded end portions, and adhesive material interposed between the wrapped sticks of gum for detachably securing the several sticks in stacked formation, the individual sticks of gum of the stack being successively detachable therefrom without disrupting the adhesive material on the covering strips or disturbing the continuity of the remaining sticks of gum.

CHARLES C. BALDWIN.